(12) United States Patent
Koh et al.

(10) Patent No.: US 10,462,337 B2
(45) Date of Patent: Oct. 29, 2019

(54) LIQUID CRYSTAL DISPLAY DEVICE AND IMAGE PROCESSING METHOD FOR SAME

(71) Applicant: SAMSUNG DISPLAY CO., LTD., Yongin-si, Gyeonggi-do (KR)

(72) Inventors: Jaihyun Koh, Yongin-si (KR); Munsan Park, Hwaseong-si (KR); Jaeho Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/921,782

(22) Filed: Mar. 15, 2018

(65) Prior Publication Data

US 2018/0270400 A1 Sep. 20, 2018

(30) Foreign Application Priority Data

Mar. 16, 2017 (KR) .......... 10-2017-0033024

(51) Int. Cl.
| | | |
|---|---|---|
| *H04N 5/202* | (2006.01) | |
| *G09G 3/00* | (2006.01) | |
| *G09G 3/36* | (2006.01) | |
| *G06T 5/00* | (2006.01) | |
| *G06T 7/50* | (2017.01) | |
| *G02F 1/1362* | (2006.01) | |

(Continued)

(52) U.S. Cl.
CPC ....... *H04N 5/202* (2013.01); *G02F 1/136286* (2013.01); *G06T 5/008* (2013.01); *G06T 7/11* (2017.01); *G06T 7/194* (2017.01); *G06T 7/50* (2017.01); *G09G 3/003* (2013.01); *G09G 3/3648* (2013.01); *G09G 2310/0264* (2013.01); *G09G 2320/0673* (2013.01); *H04N 9/69* (2013.01)

(58) Field of Classification Search
CPC .......... H04N 5/202; H04N 9/69; G06T 7/194; G09G 2320/0673
See application file for complete search history.

(56) References Cited

U.S. PATENT DOCUMENTS 9,497,448 B2    11/2016  Lee et al.
2014/0035902 A1*  2/2014  An ...................... H04N 13/128
                                                          345/419

(Continued)

FOREIGN PATENT DOCUMENTS

KR      101319068 B1    10/2013
KR    1020140088029 A    7/2014

(Continued)

*Primary Examiner* — Ahmed A Berhan
(74) *Attorney, Agent, or Firm* — Cantor Colburn LLP

(57) ABSTRACT

A display device includes a substrate, a plurality of gate lines disposed on the substrate, and which extends in first direction, a plurality of data lines disposed on the substrate, and which extends in a second direction intersecting the first direction, pixels connected to the gate lines and the data lines, a data drive unit which applies data signals to the data lines, a gate drive unit which supplies gate signals to the gate lines, a timing controller which controls the data signals and the gate signals, an image depth analysis unit which receives an image signal, and generates a foreground image signal based on an image depth of the image signal, and a gamma correction unit which generates a gamma-corrected image signal by applying a plurality of gamma curves to the foreground image signal.

19 Claims, 12 Drawing Sheets

(51) Int. Cl.
*H04N 9/69* (2006.01)
*G06T 7/11* (2017.01)
*G06T 7/194* (2017.01)

(56) References Cited

U.S. PATENT DOCUMENTS

2014/0247289 A1* 9/2014 Park .................. G09G 3/2055
345/690
2016/0138774 A1 5/2016 Joo et al.

FOREIGN PATENT DOCUMENTS

| KR | 1020140108957 A | 9/2014 |
| KR | 1020160059708 A | 5/2016 |

* cited by examiner

LIQUID CRYSTAL DISPLAY DEVICE AND IMAGE PROCESSING METHOD FOR SAME

This application claims priority to Korean Patent Application No. 10-2017-0033024, filed on Mar. 16, 2017, and all the benefits accruing therefrom under 35 U.S.C. § 119, the content of which in its entirety is herein incorporated by reference.

1. Technical Field

The invention relates to a display device and an image processing method for the same, which can analyze image depths of input image signals and can change gamma correction for a partial region.

2. Discussion of Related Art

A display device, such as a liquid crystal display ("LCD"), an organic light emitting diode display, or the like, generally includes a display substrate configured to include switching devices, a plurality of pixels, and a plurality of signal lines, a grayscale voltage generation unit configured to generate grayscale reference voltages, a data drive unit configured to generate a plurality of grayscale voltages by using the grayscale reference voltages, and to apply grayscale voltages of the generated grayscale voltages corresponding to input image signals to data lines as data signals.

Of the above display devices, a liquid crystal display device generally includes two display panels configured to include pixel electrodes and counter electrodes, and a liquid crystal layer configured to be disposed between the two display panels, and to have dielectric anisotropy. The pixel electrodes are arranged in a matrix form, are connected to switching devices, such as thin film transistors ("TFTs") or the like, and receive data voltages on a per-row basis. The counter electrodes are formed throughout front surfaces of the display panels, and receive a common voltage ("Vcom"). Electric fields are generated in the liquid crystal layer by applying voltages to the pixel electrodes and the counter electrodes, and a desired image is acquired by controlling transmission rates of light via the liquid crystal layer through control of strengths of the electric fields.

A liquid crystal display device receives image signals of a plurality of primary colors, such as red, green, and blue, from an external graphics source. A signal control unit of the liquid crystal display device appropriately processes the image signals, and provides the processed image signals to a data drive unit, and the data drive unit selects analog voltages corresponding to the image signals, and applies the analog voltages to the display panels of the liquid crystal display device as data signals.

A liquid crystal display device may have side surface visibility that is visibly poorer than front surface visibility. In order to overcome this problem, there is a proposed method which divides each pixel into two sub-pixels and applies two different voltages to the two sub-pixels. However, when pixels are divided into sub-pixels, an aperture ratio is decreased due to an increase in an area of drive devices, and luminance of the display device is reduced.

SUMMARY

The invention may be directed to a display device and an image processing method for the same, which can analyze depths of input image signals and can selectively apply composite gamma correction only to image signals corresponding to pixels on which a front surface image is displayed, thereby improving side surface visibility.

According to an exemplary embodiment of the invention, an image signal processing method includes receiving an image signal, extracting an image depth of the image signal by analyzing the image signal if the image signal does not include separate image depth information, separating the image signal into a foreground image signal and a background image signal based on the image depth, correcting the foreground image signal based on a plurality of gamma curves, and correcting the background image signal by applying a single gamma curve to the background image signal.

In an exemplary embodiment, correcting the foreground image signal may include generating a first gamma-corrected image signal by applying a first gamma curve, having a first gamma value, to a part of the foreground image signal, and generating a second gamma-corrected image signal by applying a second gamma curve, having a second gamma value different from the first gamma value, to a remainder of the foreground image signal.

In an exemplary embodiment, the image signal processing method may further include providing the first gamma-corrected image signal to a first pixel and the second gamma-corrected image signal to a second pixel in a first frame.

In an exemplary embodiment, the first pixel is provided with a gamma-corrected image signal generated by applying the second gamma curve and the second pixel is provided with a gamma-corrected image signal generated by applying the first gamma curve in a second frame next to the first frame.

In an exemplary embodiment, ccorrecting the background image signal may include generating a third gamma-corrected image signal by applying a third gamma curve, having a third gamma value, to the background image signal, and the third gamma value may be a value between the first gamma value and the second gamma value.

In an exemplary embodiment, separating the image signal may include designating a first portion of the image signal as the foreground image signal when a depth of the first portion of the image signal is higher than a reference image depth, and designating a second portion of the image signal as the background image signal when the depth of the second portion of the image signal is lower than the reference image depth.

In an exemplary embodiment, the reference image depth may be a median value of maximum and minimum image depths of the image signal.

In an exemplary embodiment, the reference image depth may be set by a user.

In an exemplary embodiment, the image depth of the image signal may not be extracted by analyzing the image signal if the image signal includes the separate image depth information.

According to another exemplary embodiment of the invention, a display device includes a substrate, a plurality of gate lines disposed on the substrate, and which extends in first direction, a plurality of data lines disposed on the substrate, and which extends in a second direction which intersects the first direction, pixels connected to the gate lines and the data lines, a data drive unit which applies data signals to the plurality of data lines, a gate drive unit which supplies gate signals to the plurality of gate lines, a timing controller which controls the data signals and the gate signals, an image depth analysis unit which receives an image signal, and generates a foreground image signal based on an image depth of the image signal, and a gamma correction unit which generates a gamma-corrected image signal by applying a plurality of gamma curves to the foreground image signal.

In an exemplary embodiment, the image depth analysis unit may include an image depth extractor which extracts the image depth of the image signal, and an image separator which designates a first portion of the image signal as the foreground image signal when an image depth of the first portion of the image signal is higher than a reference image depth and designates a second portion of the image signal as a background image signal when an image depth of the second portion of the image signal is lower than the reference image depth.

In an exemplary embodiment, the gamma correction unit may include a composite gamma corrector which generates a first gamma-corrected image signal by applying a first gamma curve to a part of the foreground image signal and generates a second gamma-corrected image signal by applying a second gamma curve to a remainder of the foreground image signal.

In an exemplary embodiment, the gamma correction unit may further include a single gamma corrector which generates a third gamma-corrected image signal by applying a third gamma curve to the background image signal.

In an exemplary embodiment, the display device may further include a corrected image signal output unit which, in a first frame, receives the first gamma-corrected image signal, the second gamma-corrected image signal, and the third gamma-corrected image signal, and outputs the first gamma-corrected image signal, the second gamma-corrected image signal, and the third gamma-corrected image signal to the data drive unit.

In an exemplary embodiment, in the first frame, the first gamma-corrected image signal may correspond to a data signal to be supplied to a first pixel, and the second gamma-corrected image signal may correspond to a data signal to be supplied to a second pixel, and in a second frame next to the first frame, the first pixel is provided with a data signal corresponding to a gamma-corrected image signal generated by applying the second gamma curve and the second pixel is provided with a data signal corresponding to a gamma-corrected image signal generated by applying the first gamma curve.

In an exemplary embodiment, a gamma correction value of the third gamma curve of the input image signal may be between gamma correction values of the first gamma curve and the second gamma curve.

In an exemplary embodiment, the image depth analysis unit may receive the reference image depth from a user, and may set the reference image depth.

In an exemplary embodiment, the image depth analysis unit may determine the reference image depth based on a degree of degradation of image quality by comparing a foreground image, a background image, and an input image.

In an exemplary embodiment, the image depth analysis unit may analyze the image quality by applying at least one of a structural similarity index measuring ("SSIM") analysis technique, a peak signal-to-noise ratio ("PSNR") analysis technique, and a histogram analysis technique.

In an exemplary embodiment, the image depth analysis unit may construct an image object by grouping parts of the image signal having similarities in image depths thereof.

BRIEF DESCRIPTION OF THE DRAWINGS

An appreciation of the invention by a person of ordinary skill in the art will become more apparent by describing in detail exemplary embodiments thereof with reference to the accompanying drawings, wherein.

DETAILED DESCRIPTION

Figure 1:
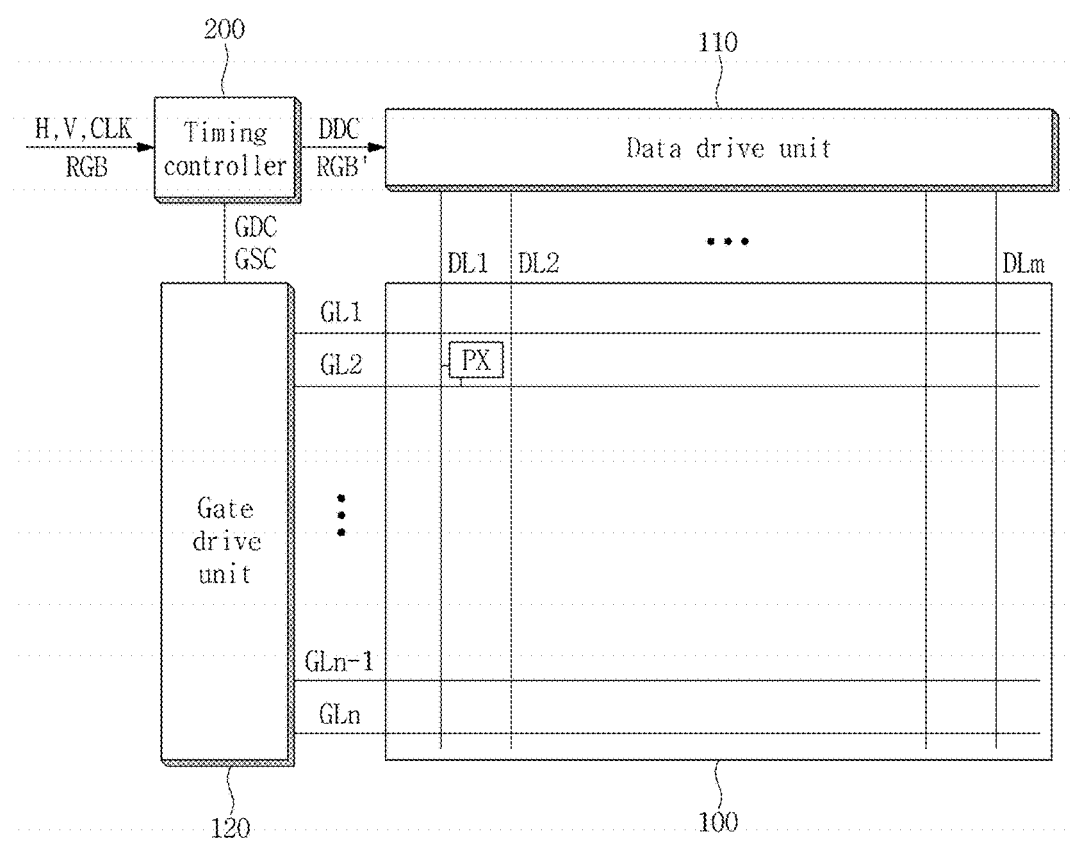
FIG. 1 is a diagram illustrating an exemplary embodiment of a configuration of a display device according to the invention.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

Throughout the specification, when an element is described as being "connected" to another element, the element is "directly connected" to the other element, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

FIG. 1 is a diagram illustrating an exemplary embodiment of a configuration of a display device 10 according to the invention.

As illustrated in FIG. 1, an exemplary embodiment of the display device 10 according to the invention includes a display panel 100, a data drive unit 110, a gate drive unit 120, and a timing controller ("T-CON") 200.

Although not illustrated in the drawing, the display device 10 including the display panel 100 may further include a backlight unit (not illustrated) configured to provide light to the display panel 100 and a pair of polarizers (not illustrated).

The display panel 100 includes a plurality of gate lines GL1 to GLn, a plurality of data lines DL1 to DLm configured to be insulated from and intersect the plurality of gate lines GL1 to GLn, and a plurality of pixels PX electrically connected to the plurality of gate lines GL1 to GLn and the plurality of data lines DL1 to DLm. The plurality of gate lines GL1 to GLn are connected to the gate drive unit 120, and the plurality of data lines DL1 to DLm are connected to the data drive unit 110.

The data drive unit 110 includes a plurality of data drive integrated circuits ("ICs") (not illustrated). The data drive unit 110 receives a corrected image signal RGB' and a data drive control signal DDC from the timing controller 200. The data drive unit 110 generates sampled data signals by sampling the corrected image signal RGB' in response to the data drive control signal DDC, latches sampled image signals corresponding to one horizontal line in each horizontal period, and supplies the latched image signals to the data lines DL1 to DLm.

The gate drive unit 120 receives a gate drive control signal GDC and a gate shift clock GSC from the timing controller 200. The gate drive unit 120 sequentially generates gate signals in response to the gate drive control signal GDC and the gate shift clock GSC, and supplies the generated gate signals to the gate lines GL1 to GLn. The timing controller 200 performs signal processing on an image signal RGB received from the outside, and supplies the signal-processed image signal RGB' to the data drive unit 110.

The timing controller 200 may analyze image depth of the input image signal RGB, and may selectively perform gamma correction based on the image depth. Furthermore, the timing controller 200 generates the data drive control signal DDC and the gate drive control signal GDC using horizontal and vertical synchronization signals H and V in response to a clock signal CLK, and supplies the data drive control signal DDC and the gate drive control signal GDC to the data drive unit 110 and the gate drive unit 120, respectively. In this case, the data drive control signal DDC may include a source shift clock, a source start pulse, a data output enable signal, and the like, and the gate drive control signal GDC may include a gate start pulse, a gate output enable signal, and the like.

Figure 2:
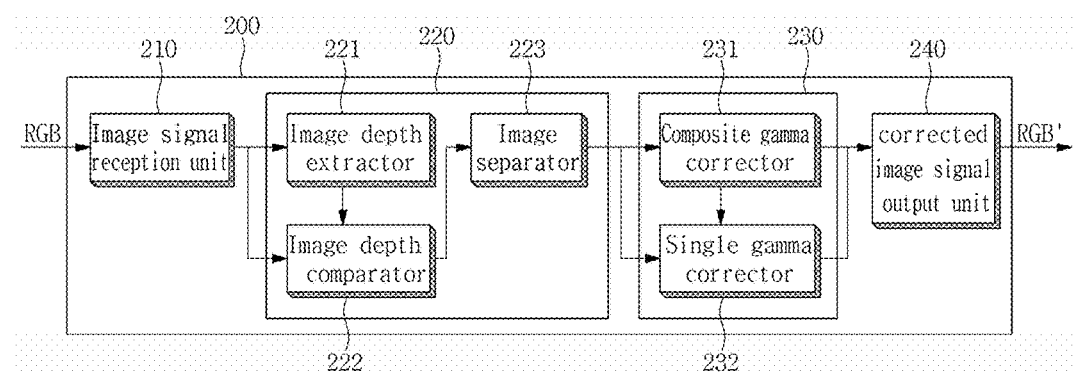
FIG. 2 is an internal block diagram of an exemplary embodiment of a timing controller according to the invention.

FIG. 2 is an internal block diagram of an exemplary embodiment of a timing controller according to the invention.

Referring to FIG. 2, an exemplary embodiment of a timing controller 200 according to the invention includes an image signal reception unit 210, an image depth analysis unit 220, a gamma correction unit 230, and a corrected image signal output unit 240. Since signal control functions except for an image gamma correction function are the same as those of a conventional timing controller, a description thereof is omitted.

The image signal reception unit 210 receives the image signal RGB. The image signal RGB may be a 2D image signal or a 3D image signal. The image signal reception unit 210 determines whether the input image signal is a 2D image signal or a 3D image signal by analyzing characteristics of the input image signal. The image depth analysis unit 220 determines whether to apply depth analysis of the image signal based on the characteristics of the input image signal analyzed by the image signal reception unit 210.

The image depth analysis unit 220 separates the image signal RGB into a foreground image signal and a background image signal based on the image depth of the image signal RGB.

The image depth analysis unit 220 includes an image depth extractor 221, an image depth comparator 222, and an image separator 223. The image depth extractor 221 may extract image depths of images corresponding to respective pixels from the image signal RGB by analyzing the image signal RGB when the image signal RGB is a 2D image signal. The image depth may be defined as a numerical value corresponding to a perspective of an object or a unit image signal in an image displayed by the input image signal RGB. The object may refer to a distinguishable aggregate, such as a person, a thing, or the like which is included in the image corresponding to the image signal RGB. However, the object according to the invention may be defined as an image corresponding to a single pixel. Furthermore, when a single object has various image depths depending on a portion thereof, the image depth extractor 221 may separate the object into sub-objects having similar image depths.

In the case of a 3D input image signal, the image depth may refer to parallax of an object between a left-eye image and a right-eye image of the 3D input image signal. The image depth extractor 221 may compare a difference between the left-eye image signal and the right-eye image signal, and may determine an object having a larger parallax as a foreground object and determine an object having a smaller parallax as a background object. In contrast, in the case of a 2D input image, the image signal does not include an image depth. Accordingly, the image depth extractor 221 may construct an image depth map by performing signal processing on a 2D input image signal. Previously developed technologies may be applied as a method of constructing an image depth map. One method of constructing the image depth map is a scheme using a histogram. The scheme using a histogram is configured to detect boundary of an object via a histogram of the image signal RGB and variations in signal characteristics between adjacent pixels and to extract an image depth of the object using signal characteristics of the object, such as clarity, and a speed of the object. The detailed image depth extraction method will be described later.

The image depth comparator 222 compares the calculated image depth of the object with a reference image depth. The reference image depth is a reference value to determine whether an object included in the image 310 is a foreground object or a background object. The reference image depth may be set to a median value between minimum and maximum image depths of the objects. In an exemplary embodiment, for example, in the image signal, when the image depth is set to a value ranging from 0 to 255, the reference image depth may be set to 127. When the reference image depth is set to 127, an object having an image depth value equal to or higher than 127 is designated as a foreground object, and an object having an image depth value lower than 127 is designated as a background object. The reference image depth may be set in various manners according to characteristics of an object included in an image, and may be individually adjusted by a user.

The image separator 223 divides image signals corresponding to objects designated by the image depth comparator 222 into a foreground image signal and a background image signal.

The gamma correction unit 230 includes a composite gamma corrector 231 and a single gamma corrector 232.

The gamma correction unit 230 corrects the foreground image signal and the background image signal, output from the image depth analysis unit 220, based on different gamma curves. Gamma correction is a method which corrects an input grayscale value of an image signal based on a gamma curve and outputs the corrected signal. The fact that gamma curves are different in two cases means different output values for the same input grayscale value may be obtained in the two cases. The gamma curves are determined based on characteristics of an image display device having a specific gamma.

The foreground image signal corresponds to an image of a front one of objects included in an image corresponding to the image signal RGB, and also corresponds to one of the objects which represents the most important information. The composite gamma corrector 231 forms a plurality of pixel groups based on adjacent pixels thereof and then performs gamma correction by applying two different types of gamma curves such that a foreground image has higher visibility than a background image.

The gamma curves include a first gamma curve GH (see FIG. 6) adapted to output a higher luminance value and a second gamma curve GL adapted to output a lower luminance value for the same input grayscale value. The composite gamma corrector 231 may generate a first gamma-corrected image signal by applying the first gamma curve GH, having a first gamma value, to a part of a foreground image signal, and generates a second gamma-corrected image signal by applying a second gamma curve, having a second gamma value different from the first gamma value, to a remainder of the foreground image signal.

The gamma correction unit 230 switches between the first gamma curve GH and the second gamma curve GL according to a spatial location of a pixel, and may switch between the first gamma curve GH and the second gamma curve GL on a per-frame basis based on time division. In an exemplary embodiment, for example, as to adjacent first and second pixels, during a first frame interval, the gamma correction unit 230 may generate a first gamma-corrected image signal by applying the first gamma curve GH to a foreground image signal corresponding to the first pixel, and generates a second gamma-corrected image signal by applying the second gamma curve GL to a foreground image signal corresponding to the second pixel. During a second frame interval next to the first frame interval, the gamma correction unit 230 may generate a third gamma-corrected image signal by applying the second gamma curve GH to a foreground image signal corresponding to the first pixel, and may generate a fourth gamma-corrected image signal by applying the first gamma curve GL to a foreground image signal corresponding to the second pixel. The gamma correction unit 230 may use a combination of a spatially distributed arrangement and a temporally distributed arrangement as a method of applying the first gamma correction curve GH and the second gamma correction curve GL to pixels.

The background image corresponds to a background one of objects included in an image, and is considered to be information which is located farther from a user and has less importance than a foreground image.

The single gamma corrector 232 may generate a gamma-corrected image signal by applying a single gamma curve to a background image signal. Single gamma correction is configured to apply a third gamma curve GM (see FIG. 8) having a gamma value different from those of the first gamma curve GH and the second gamma curve GL. The third gamma curve GM may be a curve which is located between the first gamma curve GH and the second gamma curve GL. In an exemplary embodiment, for the same input value, an output value of the third gamma curve GM may be an average value of the first gamma curve GH and the second gamma curve GL. The fact that the third gamma curve GM is located between the first gamma curve GH and the second gamma curve GL means that an output value of the third gamma curve GM for the same input grayscale value is a value between an output value of the first gamma curve GH and an output value of the second gamma curve GL.

The gamma correction unit 230 outputs the generated first gamma-corrected image signal, second gamma-corrected image signal, and third gamma-corrected image signal to the corrected image signal output unit 240 during the first frame interval.

The corrected image signal output unit 240 transmits the first to third gamma-corrected image signals, received from the gamma correction unit 230, to the data drive unit 110 during the first frame interval. The corrected image signal output unit 240 samples the gamma-corrected image signals as a corrected image signal RGB' corresponding to a single horizontal line and then outputs the corrected image signal RGB' such that the gamma-corrected image signals can be applied to the data drive unit 110.

Although the image depth analysis unit 220 and the gamma correction unit 230 have been described as being included in the timing controller 200 in the description given in conjunction with FIG. 2, the image depth analysis unit 220 and the gamma correction unit 230 may be included in an image signal processing unit (not illustrated) preceding the timing controller 200 in signal processing. Alternatively, the image depth analysis unit 220 may be included in the image signal processing unit (not illustrated), and the gamma correction unit 230 may be included in the timing controller 200.

FIGS. 3A to 3D are views illustrating examples of objects of an input image with image depths according to the invention.

Figure 3A:
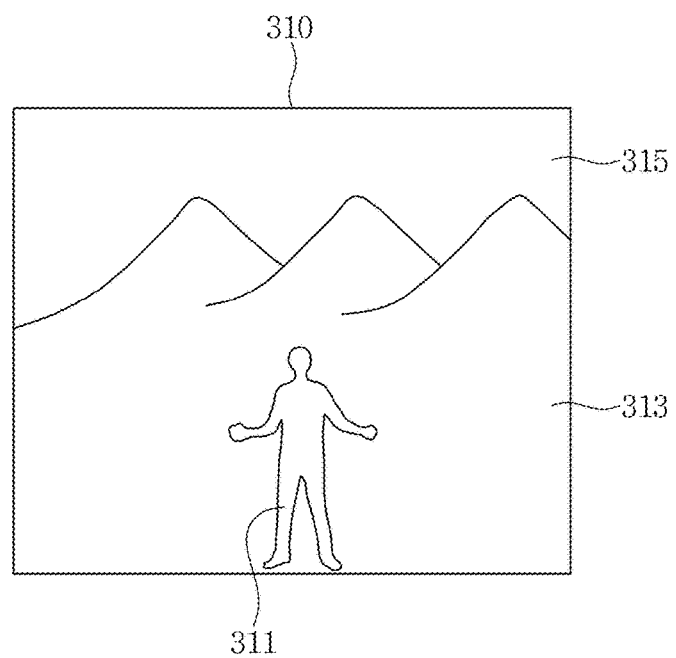
FIG. 3A is an image corresponding to an input image signal.

FIG. 3A is an image 310 corresponding to an input image signal RGB. The input image 310 illustrated in FIG. 3A includes a first object 311 representing a human, a second object 313 representing a background mountain, and a third object 315 representing a sky.

Figure 3B:
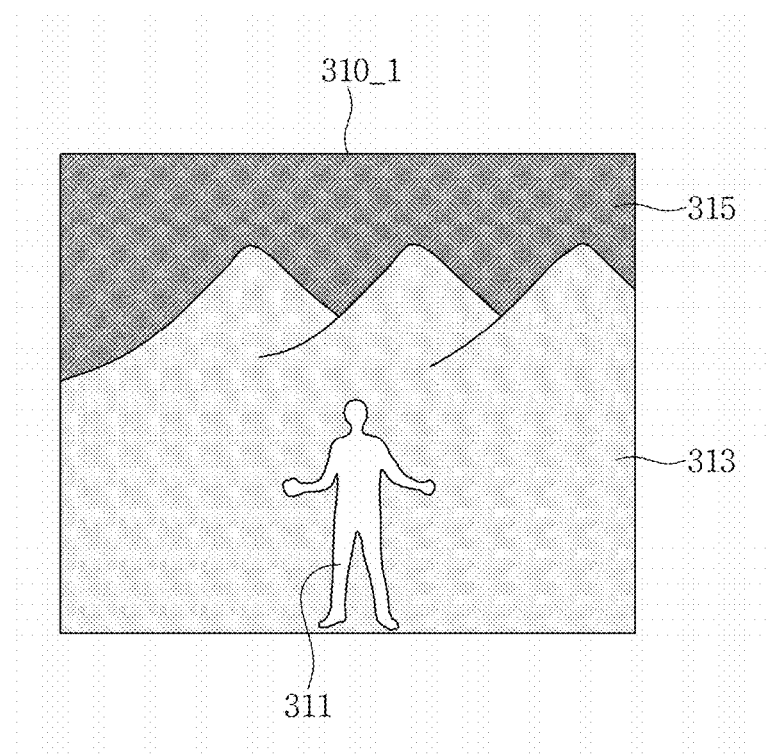
FIG. 3B is an image depth map of the input image of FIG. 3A.

FIG. 3B is an image depth map 310_1 of the input image 310 of FIG. 3A.

The image depth may be represented using numerical values ranging from 0 to 255 obtained through digital processing of individual pixels. In an exemplary embodiment, for example, an object located on a front surface of the image 310 may have a higher image depth value and be displayed in a brighter color on the image depth map, and an object located on a back surface of the image 310 may have a lower image depth value and be displayed in a darker color on the image depth map. In FIG. 3B, the first object 311 representing a human is located on a foremost surface of the image 310 and is displayed in a white color, and the second object 313 representing a background mountain is located in a middle of the image 310 and is displayed in a gray color in the image depth map 310_1. The third object 315 representing a sky is located farthest in the image 310 and is displayed in a dark gray in the image depth map 310_1.

The image depth extractor 221 may extract an image depth of each object by analyzing the input image signal RGB. In an exemplary embodiment, a stereo matching technique, a focus technique, or a geometric information-based technique may be applied as a method of extracting image depth from an input 2D image signal.

The stereo matching technique is basically configured to capture two or more images having different viewpoints and to search for corresponding points between the captured images. When cameras have been calibrated, 3D image depth information can be derived by applying trigonometry to the corresponding points.

The focus technique uses a phenomenon in which a single portion is generally focused on when an image is captured, a closer object is generally focused on and clearly represented, and a farther region is vaguely represented. In particular, this phenomenon is more prominent in a boundary portion between an object and a background. In other words, a region closer from a camera has finer texture, and a boundary region which is focused on is represented more sharply than other boundary regions. In the focus technique, although a portion which is focused on is generally located closer, an object which is located closer may not be focused on according to characteristics of an image. According to the focus technique, the image depth extractor 221 may determine a closer object of the image 310 to be the background image when the closer object of the image 310 is not focused on. Accordingly, the image depth may be selected based on an object which is focused on.

Still another method is the geometric information-based scheme. The geometric information-based scheme uses a principle that a vanishing point at which main rectilinear lines present within an image meet together is farthest and the farther from the vanishing point along vanishing lines (i.e., the rectilinear lines which extend from the vanishing point) an object is located, the closer to the front surface of the image the object is. Through this technique, image depth can be extracted. In addition to the above-illustrated schemes, a combination of a plurality of schemes may be used, and a scheme of applying weights to the above-illustrated schemes may be applied.

If the input image signal is a 3D image signal, the image depth extractor 221 may extract image depth from the image signal. The 3D image signal may be separated into a left-eye image signal and a right-eye image signal, and may be then input. The image depth extractor 221 may extract image depth by using a difference between binocular images. In an image, an object located farther from a user has a small difference between a location of the object in a left-eye image and a location of the object in a right-eye image. In contrast, an object located closer has a large difference between a location of the object in a left-eye image and a location of the object in a right-eye image. The image depth extractor 221 may extract image depths of the objects from the 3D image signal.

If an input image signal has separate image depth information, the input image signal may be input to the image depth comparator 222 without passing through the image depth extractor 221.

Figure 3C:
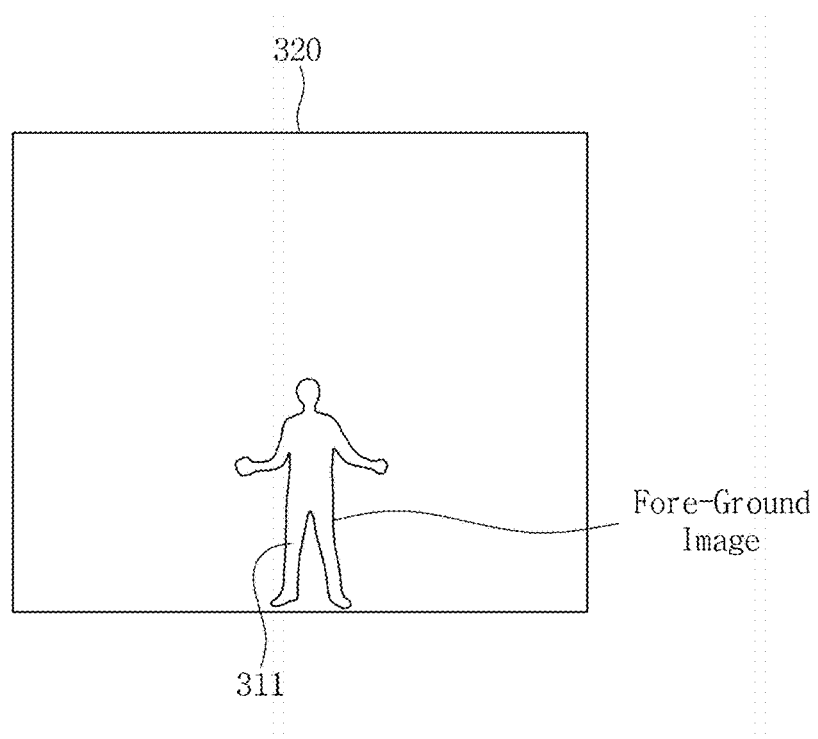
FIG. 3C is a view illustrating an exemplary embodiment of a foreground image extracted according to the invention.

FIG. 3C is a view illustrating an exemplary embodiment of a foreground image extracted according to the invention.

Figure 3D:
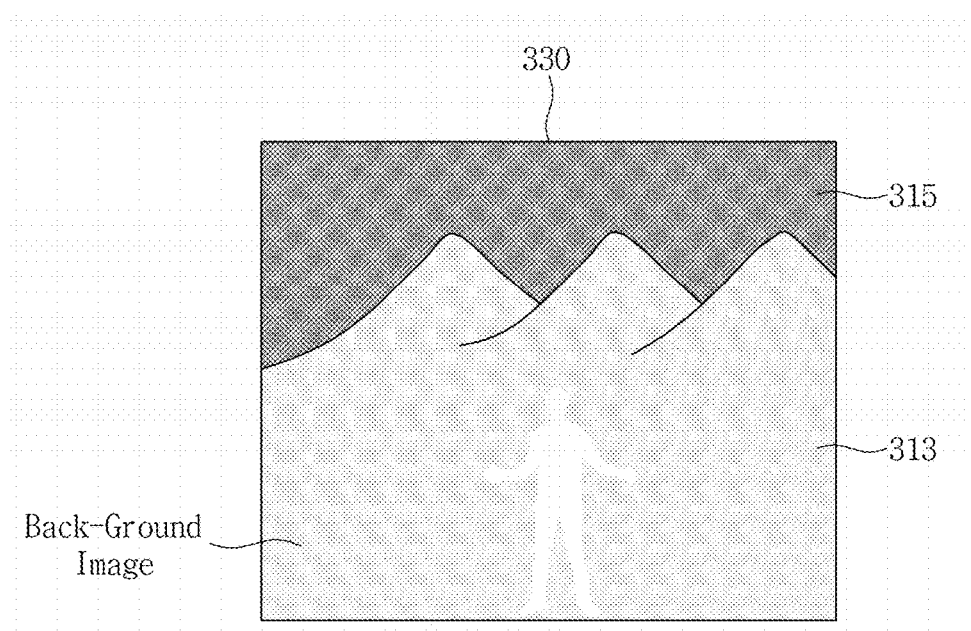
FIG. 3D is a view illustrating an exemplary embodiment of a background image extracted according to the invention.

FIG. 3D is a view illustrating an exemplary embodiment of a background image extracted according to the invention.

Referring to FIGS. 3C and 3D, in an input image 310, the first object 311 corresponds to a foreground image 320. In contrast, the second object 313 and the third object 315 correspond to a background image 330.

An image signal of the foreground image 320 is subjected to composite gamma correction based on a plurality of gamma curves during a later gamma processing process. In contrast, an image signal of the background image 330 is subjected to gamma correction based on a single gamma curve.

Figure 4:
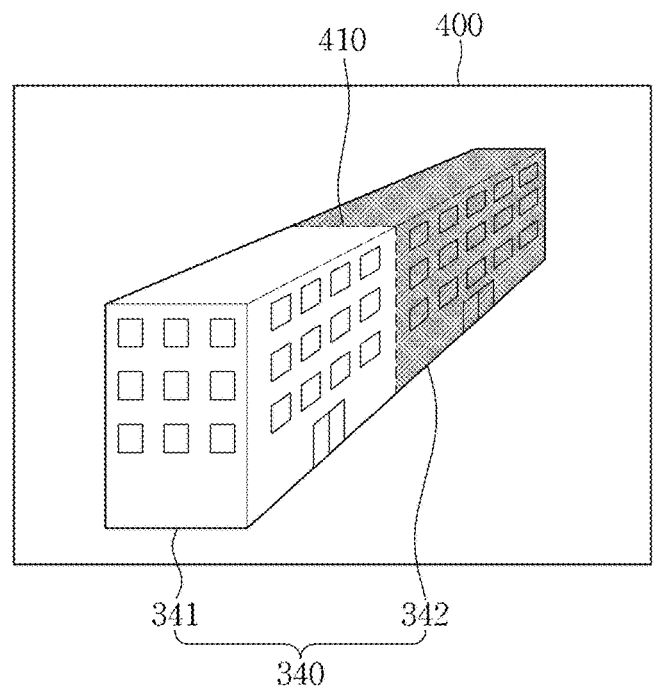
FIG. 4 is a view illustrating an example of an object having multiple image depth.

FIG. 4 is a view illustrating an example of an object having multiple image depth.

As illustrated in FIG. 4, an input image 400 may represent a building, extending from a closer location to a farther location, as a single object. As illustrated in the drawing, the single object may have image depths ranging from the closer location to the farther location. An exemplary embodiment of the image depth extractor 221 according to the invention divides an object 340 of the image 400 into a first sub-object 341 and a second sub-object 342 based on a reference image depth 410. The first sub-object 341 may be represented as the foreground image, and the second sub-object 342 may be represented as the background image.

The gamma correction unit 230 receives an image signal of the foreground image and an image signal of the background image, and may apply different types of gamma correction to the received image signals. The composite gamma corrector 231 of the gamma correction unit 230 may perform gamma correction by applying a different gamma curve to a part of the foreground image signal. In contrast, the single gamma corrector 232 may perform gamma correction by applying a single gamma curve to the background image. This can improve side surface visibility of the first sub-object 341 located closer to the user.

Figure 5:
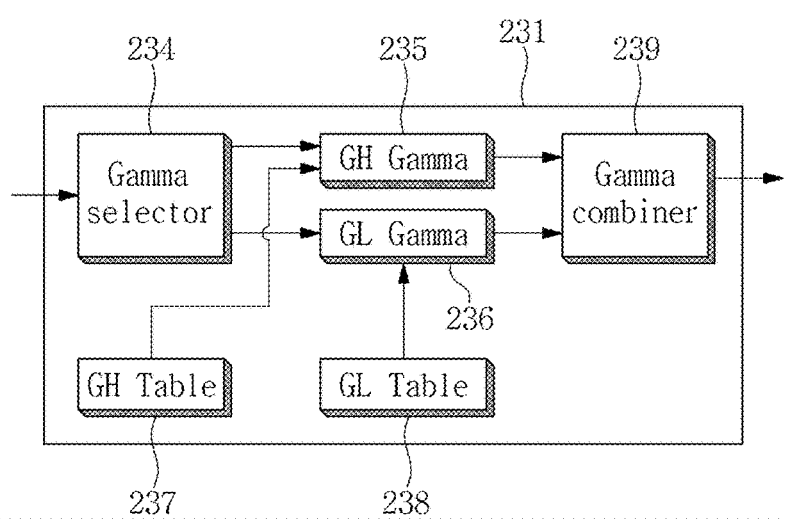
FIG. 5 is a detailed block diagram of an exemplary embodiment of a composite gamma corrector according to the invention.

FIG. 5 is a detailed block diagram of an exemplary embodiment of a composite gamma corrector according to the invention.

Figure 6:
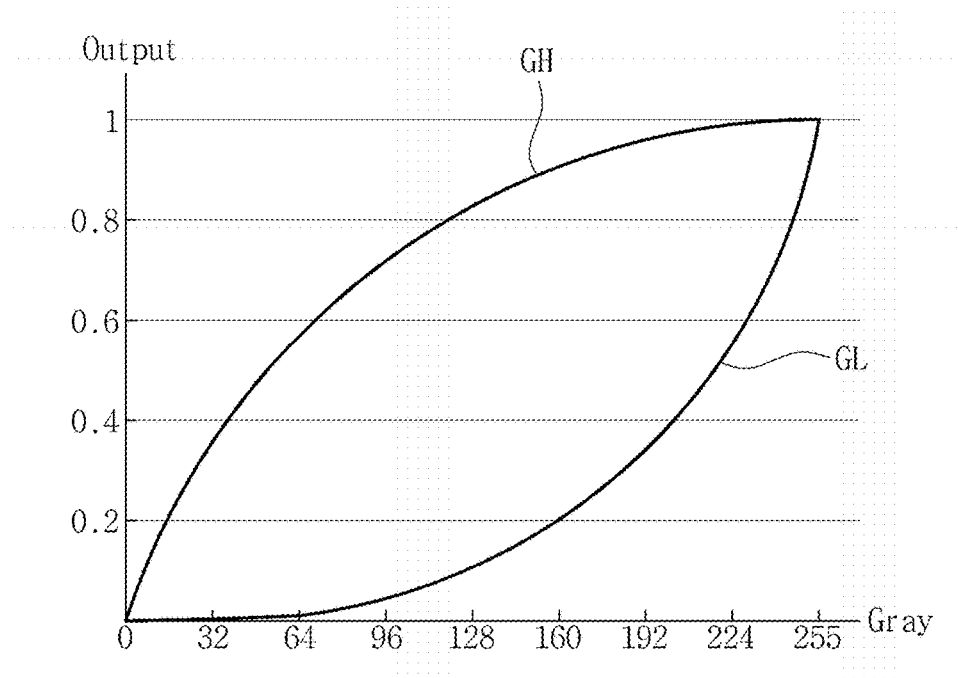
FIG. 6 is an exemplary embodiment of a composite gamma correction curve graph.

FIG. 6 is an exemplary embodiment of a composite gamma correction curve graph.

Referring to FIGS. 5 and 6, the composite gamma corrector 231 includes a gamma selector 234, a first gamma corrector GH Gamma 235, a second gamma corrector GL Gamma 236, a first gamma table GH Table 237, a second gamma table GL Table 238, and a gamma combiner 239. The gamma selector 234 divides an input foreground image signal based on locations of corresponding pixels. A part of the divided image signals is input to the first gamma corrector 235, and is then subjected to gamma correction using a first gamma curve GH. The other part of the divided image signals is input to the second gamma corrector 236, and is then subjected to gamma correction using a second gamma curve GL. The first gamma curve GH is stored in the first gamma table 237 in the form of a look-up table, and the second gamma curve GL is stored in the second gamma table 238 in the form of a look-up table.

The gamma-corrected first gamma correction image and second gamma correction image are combined by the gamma combiner 239, and are then output. In another exemplary embodiment, the first gamma correction image and the second gamma correction image may be separately output without being combined by the gamma combiner 239.

The graph of FIG. 6 indicates that grayscale values of input image signals represented by an x axis are corrected to gamma correction values represented by a y axis. A shape of a gamma curve may be determined by a gamma value thereof. When the gamma value of a gamma curve is 1, an input grayscale value and a luminance output for the input grayscale value have the same value. In contrast, when the gamma value of a gamma curve is lower than 1, a luminance output value for an input grayscale value increases, and thus an output image is displayed to be brighter. When the gamma value of a gamma curve is higher than 1, a luminance output value for an input grayscale value decreases, and thus an output image is displayed to be darker.

An illustrated first gamma curve GH is a gamma curve having a gamma value equal to or lower than 1, and is adapted to output a luminance value higher than that of an input over an overall grayscale value range. The first gamma curve GH is also called a high gamma because it is adapted to output a higher luminance value, and may be represented by "H."

In contrast, a second gamma curve GL is a gamma curve having a gamma value higher than 1, and is adapted to output a luminance value lower than that of an input. The second gamma curve GL is also called a low gamma because it is adapted to output a lower luminance value, and is represented by "L." In a case that a gamma value of 2.2 is set to a reference gamma value, it is preferable to set the second gamma curve GL, which is a low gamma, to a value lower than the reference gamma value in composite gamma correction.

Figure 7:
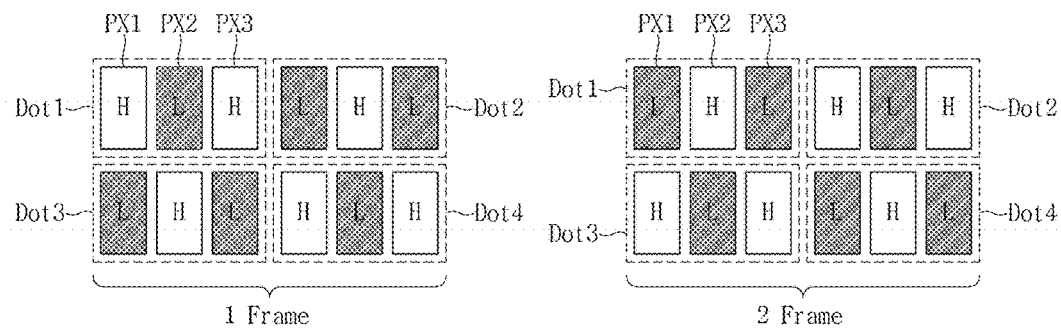
FIG. 7 is a conceptual diagram illustrating an exemplary embodiment of composite gamma correction.

FIG. 7 is a conceptual diagram illustrating an exemplary embodiment of composite gamma correction.

FIG. 7 illustrates a first dot Dot1 including a first pixel PX1, a second pixel PX2, and a third pixel PX3, a second dot Dot2 adjacent to the first dot Dot1 in a first direction, a third dot Dot3 adjacent to the first dot Dot1 in a second direction, and a fourth dot Dot4 adjacent to the second dot Dot2 in the second direction. It is assumed that every dot includes corresponding three pixels in the same order. Image signals to be applied to three pixels constituting a single dot may be corrected respectively based on any one of the first gamma curve GH and the second gamma curve GL. The gamma correction is adapted to electrically correct an image signal. Although a pixel is a physical unit for displaying a corresponding image signal and has a different concept from the image signal, correcting a pixel may be used in the same meaning as correcting an image signal corresponding to a data signal to be supplied to the pixel.

A pixel may be corrected based on a gamma curve different from a gamma curve for pixels adjacent in a row or column direction. Accordingly, if the gamma curves used to correct foreground image signals corresponding to pixels are represented on the pixels, respectively, they may be represented in a chess pattern as shown in FIG. 7. In an exemplary embodiment, for example, the first gamma curve GH may be applied to the first pixel PX1 and third pixel PX3 of the first dot Dot1, and the second gamma curve GL may be applied to the second pixel PX2 thereof in a first frame. In contrast, the second gamma curve GL may be applied to first and third pixels PX1 and PX3 of the second dot Dot2 and the third dot Dot3, and the first gamma curve GH may be applied to second pixels PX2 thereof.

Pixels to which the first gamma curve GH is applied and pixels to which the second gamma curve GL is applied are spatially distributed. Furthermore, the first gamma curve GH and the second gamma curve GL may be applied to pixels (image signals) in a time distribution manner. Referring to FIG. 7, the first gamma curve GH and the second gamma curve GL applied to image signals corresponding to pixels in the first frame may be switched with each other in a second frame next to the first frame. In other words, in the second frame, the second gamma curve GL may be applied to the first pixel PX1 and third pixel PX3 of the first dot Dot1, the first gamma curve GH may be applied to the second pixel PX2 of the first dot Dot1, the first gamma curve GH may be applied to the first and third pixels PX1 and PX3 of the second dot Dot2 and the third dot Dot3, and the second gamma curve GL may be applied to the second pixels PX2 thereof.

As the first gamma curve GH and the second gamma curve GL are switched with each other based on pixels in spatial and temporal manners, a user views average luminance which is output based on the first gamma curve GH and the second gamma curve GL. Furthermore, the application of the composite gamma curve can improve side surface visibility of a VA mode liquid crystal display panel.

Figure 8:
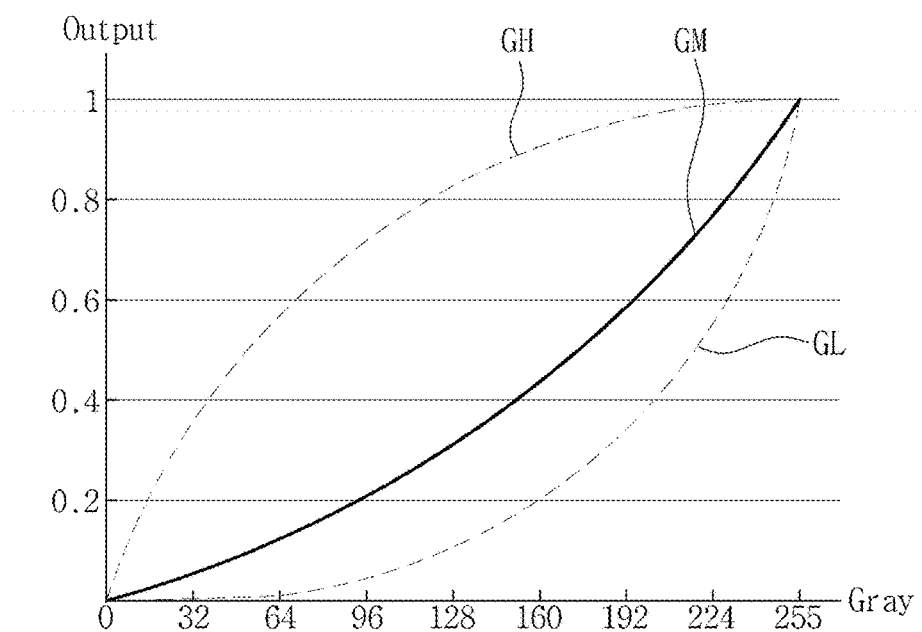
FIG. 8 is a view illustrating an example of a single gamma curve according to the invention.

FIG. 8 is a view illustrating an example of a single gamma curve according to the invention.

Referring to FIG. 8, a third gamma curve GM is a gamma curve which is applied to an image signal of the background image. The third gamma curve GM has a value between values of a first gamma curve GH and a second gamma curve GL for the same input. In an exemplary embodiment, the third gamma curve GM may be set to an average value of the values of the first gamma curve GH and the second gamma curve GL. Generally, a single gamma to be applied to a display device (e.g., an LCD device) preferably has a value of 2.2. However, the gamma value may be individually adjusted according to characteristics of a liquid crystal display panel or characteristics of an image. Although the gamma value is described as having a linear characteristic by being expressed using an operation formula in an exemplary embodiment of the invention, the gamma curve may have a nonlinear characteristic such that an output grayscale value can be adjusted for an input grayscale value of each image signal.

Figure 9:
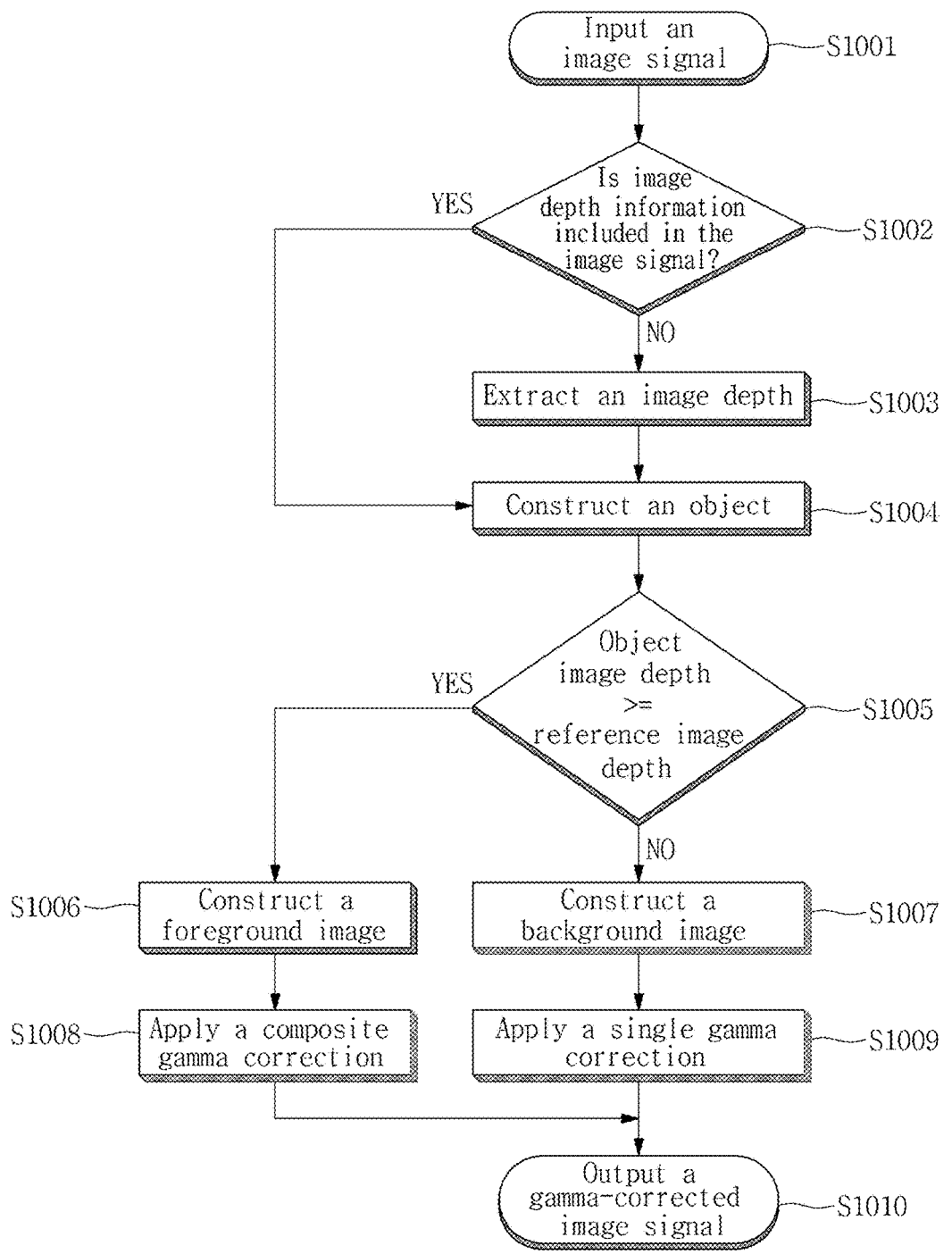
FIG. 9 is a flowchart illustrating an exemplary embodiment of an image processing method according to the invention.

FIG. 9 is a flowchart illustrating an exemplary embodiment of an image processing method according to the invention.

Referring to FIG. 9, the image signal reception unit 210 receives an image signal (S1001). The image depth extractor 221 determines whether separate image depth information is included in the input image signal (S1002). If the separate image depth information is not included in the input image signal, the image depth extractor 221 extracts an image depth of each pixel by analyzing the image signal (S1003). However, if the separate image depth information is included in the input image signal, the image depth extraction step may be omitted. The image depth extractor 221 constructs an object, extracted from the image signal, based on the image depths of the pixels (S1004). The object may be obtained as a distinguishable aggregate of pixels having similar image depths using pixel information included in the image signal. An image depth of the object may be set to an average or median value of image depths of pixels constituting the object. The image depth comparator 222 compares the image depth of the object with a set reference image depth (S1005). The reference image depth is a basis based on which the foreground image and the background image are separated from each other. The image depth may be represented by a numerical value. As a location of a user becomes closer to an object in an image, a numerical value of the image depth for the object increases. An object having an image depth higher than the reference image depth is classified as the foreground image, and an object having an image depth lower than the reference image depth is classified as the background image. However, this is merely an example. In another exemplary embodiment, if numerical values representing image depths are conversely constructed, an object having a lower image depth may be defined as being closer to a user.

The image separator 223 constructs the foreground image including an object having a higher image depth, i.e., an object located closer to the user (S1006). Furthermore, the image separator 223 constructs the background image including an object having a lower image depth, i.e., an object located farther from the user (S1007).

The composite gamma corrector 231 receives an image signal of the foreground image from the image separator 223 and applies composite gamma correction to the image signal (S1008). The composite gamma corrector 231 uses a gamma correction technique configured to divide parts of the image signal of the foreground image 320 into two groups and to apply one of the first gamma curve GH and the second gamma curve GL to each of the groups. The single gamma corrector 232 receives an image signal of the background image from the image separator 223 and applies single gamma correction to the image signal (S1009). The single gamma corrector 232 applies the third gamma curve GM to pixels of the background image. The third gamma curve GM may be a curve which has a value between values of the first gamma curve GH and the second gamma curve GL for the same input.

The corrected image signal output unit 240 generates an output image signal by combining pieces of image signal information output from the composite gamma corrector 231 and the single gamma corrector 232 and outputs the output image signal (S1010). The output image signal is transmitted to the data drive unit 110 based on each horizontal line in synchronization with an output of a gate signal.

Figure 10:
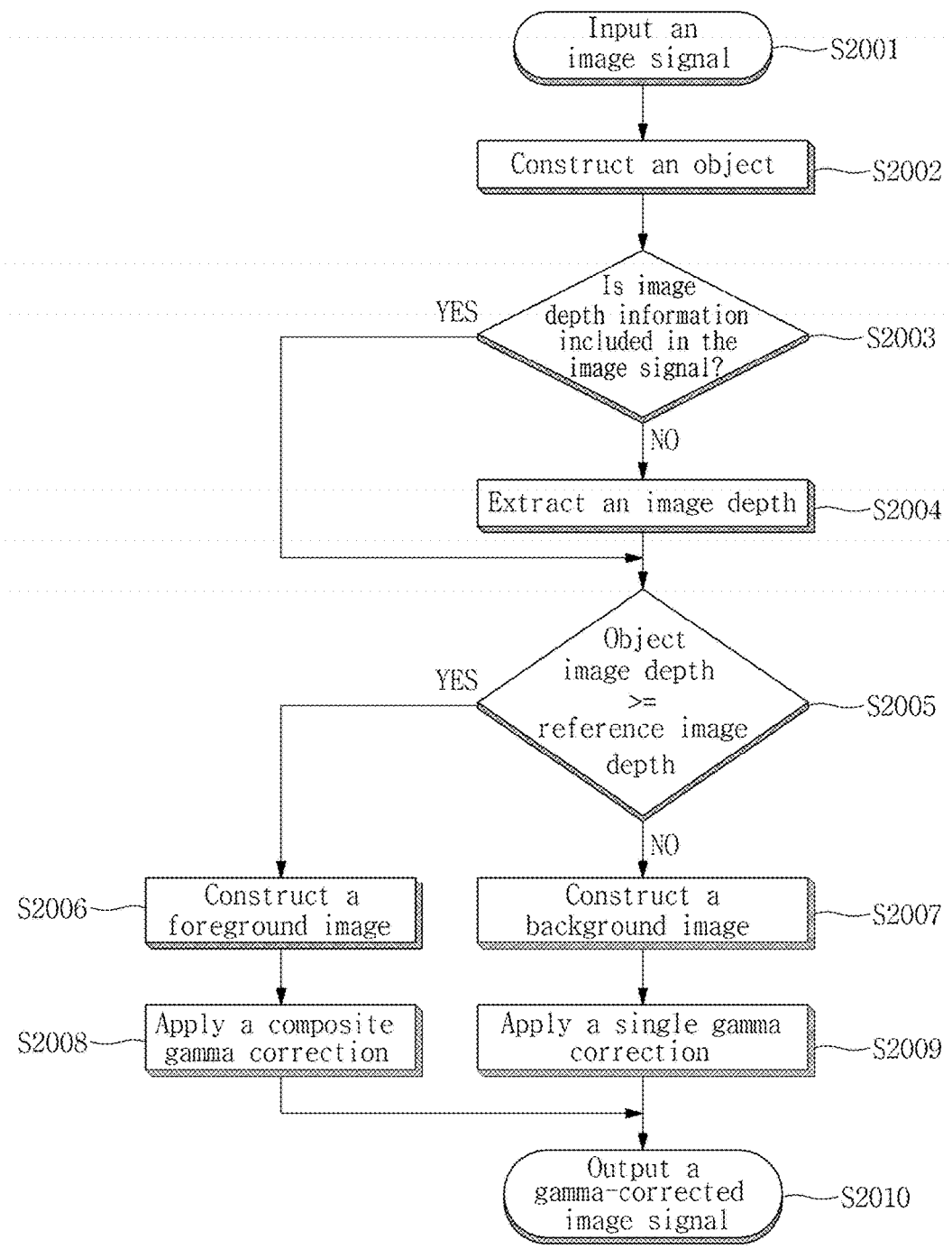
FIG. 10 is a flowchart illustrating another exemplary embodiment of an image processing method according to the invention.

FIG. 10 is a flowchart illustrating another exemplary embodiment of an image processing method according to the invention.

Referring to FIG. 10, the image signal reception unit 210 receives an image signal (S2001). The image depth extractor 221 constructs an object by analyzing the input image signal (S2002). The image depth extractor 221 constructs the object based on image information, such as focus, texture, color, and contour information. The image depth extractor 221 determines whether separate image depth information is included in the input image signal (S2003). If the separate image depth information is included in the input image signal, an image depth extraction step may be omitted. However, if the image depth information is not included in the input image signal, the image depth extractor 221 extracts an image depth of each pixel by analyzing the input image signal (S2004).

A signal processing process after the object image depth extraction step is the same as the corresponding process illustrated in FIG. 9.

As illustrated in FIG. 10, in the exemplary embodiment of gamma processing method according to the invention, the object is first extracted from the input image signal, and then image depth of the object is extracted. Through this, the image depth extractor 221 may select a central object of an image, and may classify the corresponding object as the foreground image. When the display device 10 displays an image including a plurality of objects having various image depths, it can improve visibility of important objects. Furthermore, in a moving image, a moving object can be tracked, and the composite gamma correction can be applied to the moving object. Accordingly, a gamma correction technique applied to the same object within an image of a single scene can be prevented from being changed.

Figure 11:
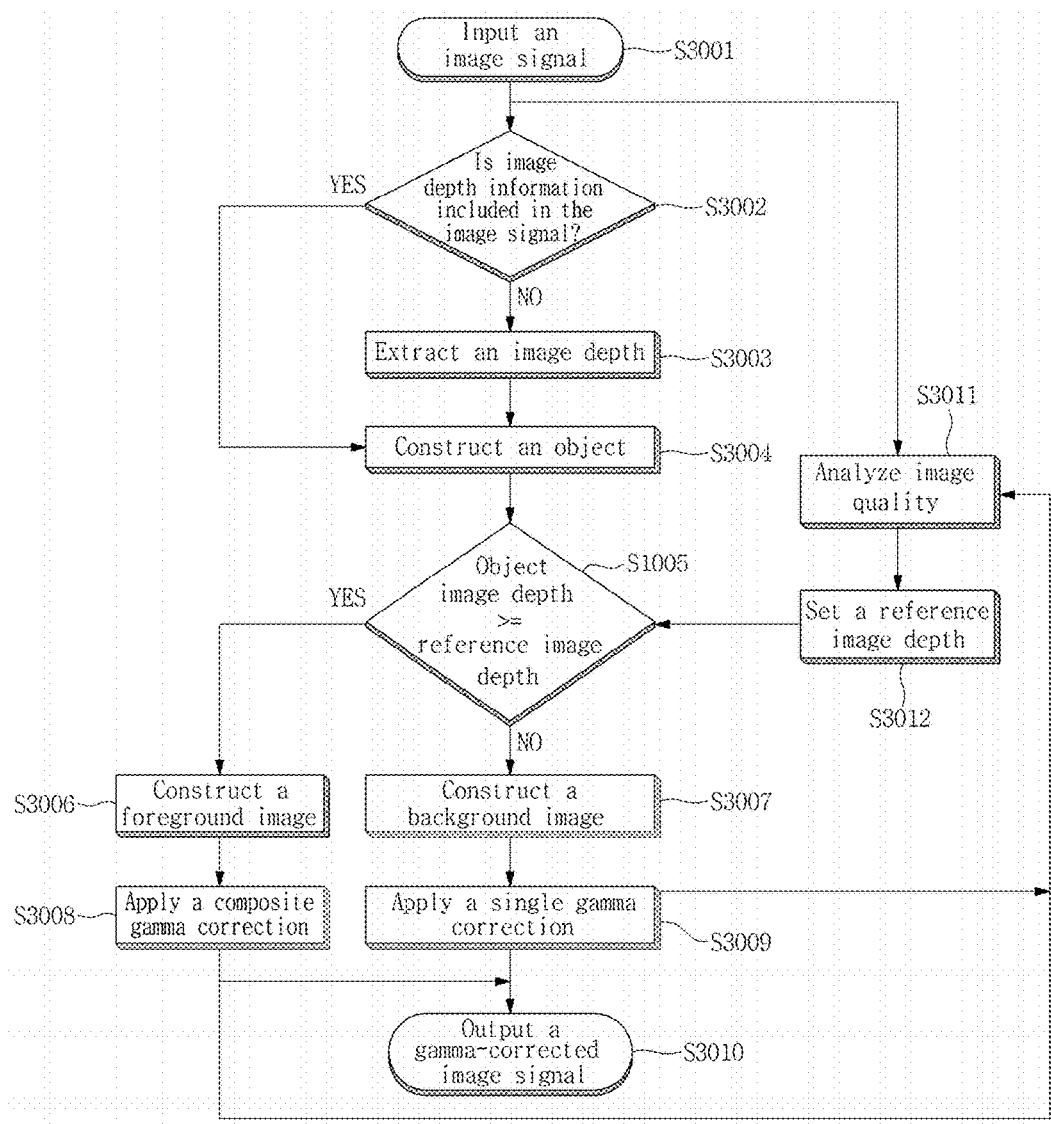
FIG. 11 is a flowchart illustrating still another exemplary embodiment of an image processing method including selection of an image depth according to the invention.

FIG. 11 is a flowchart illustrating still another exemplary embodiment of an image processing method including selection of an image depth according to the invention.

Referring to FIG. 11, a process of extracting an image depth from an input image signal and applying different gamma correction to a foreground image signal and a background image signal is performed in the same manner as illustrated in FIG. 8.

A reference image depth may be set to an optimum value by analyzing an input image signal, a foreground image signal, and a background image signal. Methods of analyzing image quality include a structural similarity index measuring ("SSIM") analysis technique, a peak signal-to-noise ratio ("PSNR") analysis technique, a histogram analysis technique, etc. The SSIM analysis technique is a method of measuring similarity with an original image signal with respect to distortion caused by compression or transformation. The SSIM analysis technique is an image quality evaluation method which recognizes a structural variation in an image rather than a variation in a numerical value. PSNR is the ratio of maximum power of a signal to power of noise. The PSNR analysis technique is an image quality evaluation method which is chiefly used to measure noise which is generated due to degradation of image quality. The histogram analysis technique is a technique of indicating frequencies of outputs based on grayscale values, and are used to evaluate image quality by analyzing a tendency of histogram distribution. Additionally, various techniques for analyzing image quality may be applied.

An exemplary embodiment of the image depth comparator 222 according to the invention analyzes a degree of degradation of image quality through gamma correction by analyzing a composite gamma-corrected foreground image signal, a single gamma-corrected background image signal, and an input image (S3011). The image depth comparator 222 sets a reference image depth such that image quality can be prevented from being degraded (S3012). The image depth comparator 222 compares the set reference image depth with an image depth of an object (S3005).

According to the invention, there is provided the display device for displaying a grayscale value using a single pixel, in which a three-dimensional effect of an image signal is analyzed and a composite gamma correction is selectively applied to a foreground image signal located on a front surface, thereby improving side surface visibility.

While the invention has been illustrated and described with reference to the exemplary embodiments thereof, it will be apparent to those of ordinary skill in the art that various changes in form and detail may be made thereto without departing from the spirit and scope of the invention.

What is claimed is:

1. An image signal processing method comprising:
receiving an image signal; extracting an image depth of the image signal by analyzing the image signal if the image signal does not include separate image depth information;
separating the image signal into a foreground image signal and a background image signal based on the image depth; correcting the foreground image signal based on a plurality of gamma curves; and correcting the background image signal by applying only a single gamma curve to the background image signal.

2. The image signal processing method according to claim 1, wherein correcting the foreground image signal comprises:
generating a first gamma-corrected image signal by applying a first gamma curve, having a first gamma value, to a part of the foreground image signal; and
generating a second gamma-corrected image signal by applying a second gamma curve, having a second gamma value different from the first gamma value, to a remainder of the foreground image signal.

3. The image signal processing method according to claim 2, further comprising providing the first gamma-corrected image signal to a first pixel and the second gamma-corrected image signal to a second pixel in a first frame.

4. The image signal processing method according to claim 3, wherein the first pixel is provided with a gamma-corrected image signal generated by applying the second gamma curve and the second pixel is provided with a gamma-corrected image signal generated by applying the first gamma curve in a second frame next to the first frame.

5. The image signal processing method according to claim 2, wherein:
correcting the background image signal comprises generating a third gamma-corrected image signal by applying a third gamma curve, having a third gamma value, to the background image signal; and
the third gamma value is a value between the first gamma value and the second gamma value.

6. The image signal processing method according to claim 1, wherein separating the image signal comprises designating a first portion of the image signal as the foreground image signal when a depth of the first portion of the image signal is higher than a reference image depth, and designating a second portion of the image signal as the background image signal when a depth of the second portion of the image signal is lower than the reference image depth.

7. The image signal processing method according to claim 6, wherein the reference image depth is a median value of maximum and minimum image depths of the image signal.

8. The image signal processing method according to claim 6, wherein the reference image depth is set by a user.

9. The image signal processing method according to claim 1, wherein the image depth of the image signal is not extracted by analyzing the image signal if the image signal includes the separate image depth information.

10. A display device comprising:
a substrate;
a plurality of gate lines disposed on the substrate, and which extends in first direction;
a plurality of data lines disposed on the substrate, and which extends in a second direction which intersects the first direction;
pixels connected to the gate lines and the data lines;
a data drive unit which applies data signals to the plurality of data lines;
a gate drive unit which supplies gate signals to the plurality of gate lines;
a timing controller which controls the data signals and the gate signals;
an image depth analyzer which receives an image signal, and generates a foreground image signal based on an image depth of the image signal; and
a gamma corrector which generates a gamma-corrected image signal by applying a plurality of gamma curves to the foreground image signal and generates a third gamma-corrected image signal by applying a third gamma curve to the background image signal.

11. The display device according to claim 10, wherein the image depth analyzer comprises:
an image depth extractor which extracts the image depth of the image signal; and
an image separator which designates a first portion of the image signal as the foreground image signal when an image depth of the first portion of the image signal is higher than a reference image depth and designates a second portion of the image signal as a background image signal when an image depth of the second portion of the image signal is lower than the reference image depth.

12. The display device according to claim 11, wherein the gamma corrector comprises a composite gamma corrector which generates a first gamma-corrected image signal by applying a first gamma curve to a part of the foreground image signal and generates a second gamma-corrected image signal by applying a second gamma curve to a remainder of the foreground image signal.

13. The display device according to claim 11, further comprising a corrected image signal output unit which, in the first frame, receives the first gamma-corrected image signal, the second gamma-corrected image signal, and the third gamma-corrected image signal, and outputs the first gamma-corrected image signal, the second gamma-corrected image signal, and the third gamma-corrected image signal to the data drive unit.

14. The display device according to claim 13, wherein in the first frame, the first gamma-corrected image signal corresponds to a data signal to be supplied to a first pixel, and the second gamma-corrected image signal corresponds to a data signal to be supplied to a second pixel, and
wherein in a second frame next to the first frame, the first pixel is provided with a data signal corresponding to a gamma-corrected image signal generated by applying the second gamma curve and the second pixel is provided with a data signal corresponding to a gamma-corrected image signal generated by applying the first gamma curve.

15. The display device according to claim 13, wherein a gamma correction value of the third gamma curve of the input image signal is between gamma correction values of the first gamma curve and the second gamma curve.

16. The display device according to claim 11, wherein the image depth analyzer receives the reference image depth from a user, and sets the reference image depth.

17. The display device according to claim 11, wherein the image depth analyzer determines the reference image depth based on a degree of degradation of image quality by comparing a foreground image, a background image, and an input image.

18. The display device according to claim 17, wherein the image depth analyzer analyzes the image quality by applying at least one of a structural similarity index measuring (SSIM) analysis technique, a peak signal-to-noise ratio (PSNR) analysis technique, and a histogram analysis technique.

19. The display device according to claim 11, wherein the image depth analyzer constructs an image object by grouping parts of the image signal having similarities in image depths thereof.

* * * * *